United States Patent

Cox

Patent Number: 5,558,194
Date of Patent: Sep. 24, 1996

[54] NEUTRAL POSITION DETENT FOR SYNCHRONIZER

[75] Inventor: David I. Cox, Wigan, England

[73] Assignee: Eaton Corporation, Cleveland, Ohio

[21] Appl. No.: 328,195

[22] Filed: Oct. 24, 1994

[30] Foreign Application Priority Data

Oct. 29, 1993 [GB] United Kingdom .................. 9322319

[51] Int. Cl.⁶ ................................................ F16D 23/06
[52] U.S. Cl. .................. 192/53.31; 192/53.331; 192/53.361; 74/339
[58] Field of Search ................. 192/53 E, 53 F, 192/53 G, 53.31, 53.331, 53.361; 74/339

[56] References Cited

U.S. PATENT DOCUMENTS

| 1,730,362 | 10/1929 | Gaylord | 192/53 G |
| 2,198,273 | 4/1940 | Reggio | 192/53 G |
| 2,229,094 | 1/1941 | Knox | 192/53 E |
| 5,092,439 | 3/1992 | Reynolds | 192/53 E |

FOREIGN PATENT DOCUMENTS

| 0492832 | 7/1992 | European Pat. Off. . | |
| 0492883 | 7/1992 | European Pat. Off. . | |
| 2538782 | 3/1977 | Germany . | |
| 380758 | 9/1932 | United Kingdom | 192/53 G |
| 1403678 | 8/1975 | United Kingdom . | |
| 1531770 | 8/1978 | United Kingdom . | |
| 2142390 | 1/1985 | United Kingdom | 192/53 E |

*Primary Examiner*—Richard M. Lorence
*Attorney, Agent, or Firm*—Paul S. Rulon

[57] ABSTRACT

A pin-type synchronizer mechanism (86) with self-energizing ramps is configured to provide self-energizing forces for reducing an operator applied shift force ($F_o$) and/or shift time. The self-energizing forces are provided by self-energizing ramp surfaces ($29e, 29f, 29g, 29h$) and ($111a, 111b, 111c, 111d$) respectively, formed in external splines (29) of a shaft 28 and in internal teeth (111) extending radially inward from a shift flange (110). The ramp surfaces provide an additive axial force ($F_a$) applied to friction rings (114, 116) via shift flange blocker surfaces ($110d, 110e$) reacting respectively against pin blocker surfaces ($118c, 118d$). The shift flange carries improved pre-energizer and neutral position centering assemblies (120) including pre-energizer plungers (124) and neutral position plungers (126) respectively for axially retaining pins (118) and friction rings (114,116) in a neutral position relative to flange (110) and for neutral positioning flange (110) relative to recesses (128) in shaft (28).

5 Claims, 5 Drawing Sheets

NEUTRAL POSITION DETENT FOR SYNCHRONIZER

FIELD OF THE INVENTION

This invention relates to a synchronizer mechanism employed in a multi-ratio transmission. Additionally, the invention relates to synchronizer mechanisms of the self-energizing type.

BACKGROUND OF THE INVENTION

Pin-type synchronizer mechanisms for use in multi-ratio transmissions are well known. Such mechanisms include friction and jaw members for respectively synchronizing and positive clutching a gear to a shaft, a plurality of pins rigidly extending from at least one friction member and through openings in a radially extending shift flange, pre-energizer assemblies for engaging the friction members in response to initial engaging movement of the flange, and blockers defined by shoulders on the pins and about the flange openings for preventing asynchronous engagement of the jaw members.

It is also known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for heavy duty trucks. U.S. Pat. No. 5,092,439, which discloses a pin-type synchronizer of the self-energizing type, is incorporated herein by reference.

SUMMARY OF THE INVENTION

An object of this invention is to improve neutral positioning of a synchronizer.

Another object of this invention is to improve neutral positioning of a synchronizer having self-energizing means.

According to a feature of this invention, a pin-type synchronizer mechanism for first and second axially spaced apart gears is mounted for rotation and secured against axial movement on a shaft means having an axis about which the gears and the shaft means rotate. The mechanism includes gear friction and gear jaw means affixed to each gear. The gear friction means is engagable with first and second axially spaced apart and axially movable friction means for respectively synchronizing the first and second gears with the shaft means. The gear jaw means is engagable with axially movable jaw means of an assembly which includes a flange extending radially between the first and second friction means and means axially connecting the flange to the axially movable jaw means. The flange is for axially moving the axially movable friction and jaw means from a neutral position into said engagement in response to an axially bi-directional shift forces ($F_o$) applied to the flange. The axially movable jaw means includes axially extending internal spline teeth having flank surfaces disposed continuously in spaces between pairs of commonly facing axially extending flank surfaces of external spline teeth affixed to the shaft means. Blocker means are operative when engaged for preventing engagement of the jaw means prior to the synchronizing. The blocker means includes a plurality of circumferentially spaced pins rigidly extending axially from the first and second friction means and into pin openings of the flange. Each of the pins has axially spaced apart blocker shoulders engagable with blocker shoulders defined on opposite sides of the flange and about the associated opening. Pre-energizer means engage either one of the first and second friction means in response to initial axial movement of the flange by the shift force ($F_o$) from the neutral position toward one of the gears for engaging the blocker means in response to engagement of the friction means producing a synchronizing torque ($T_o$) transmitted to the flange via the pins and for transmitting the shift force ($F_o$) to the engaged friction means via the engaged blocker means to increase the engaging force of the engaged friction means. The improvement is characterized by detent means resiliently reacting between the assembly and the shaft means for positioning the assembly in the neutral position.

BRIEF DESCRIPTION OF THE DRAWINGS

The synchronizer mechanism of the invention is shown in the accompanying drawings in which.

DETAILED DESCRIPTION OF THE DRAWINGS

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Figure 1:
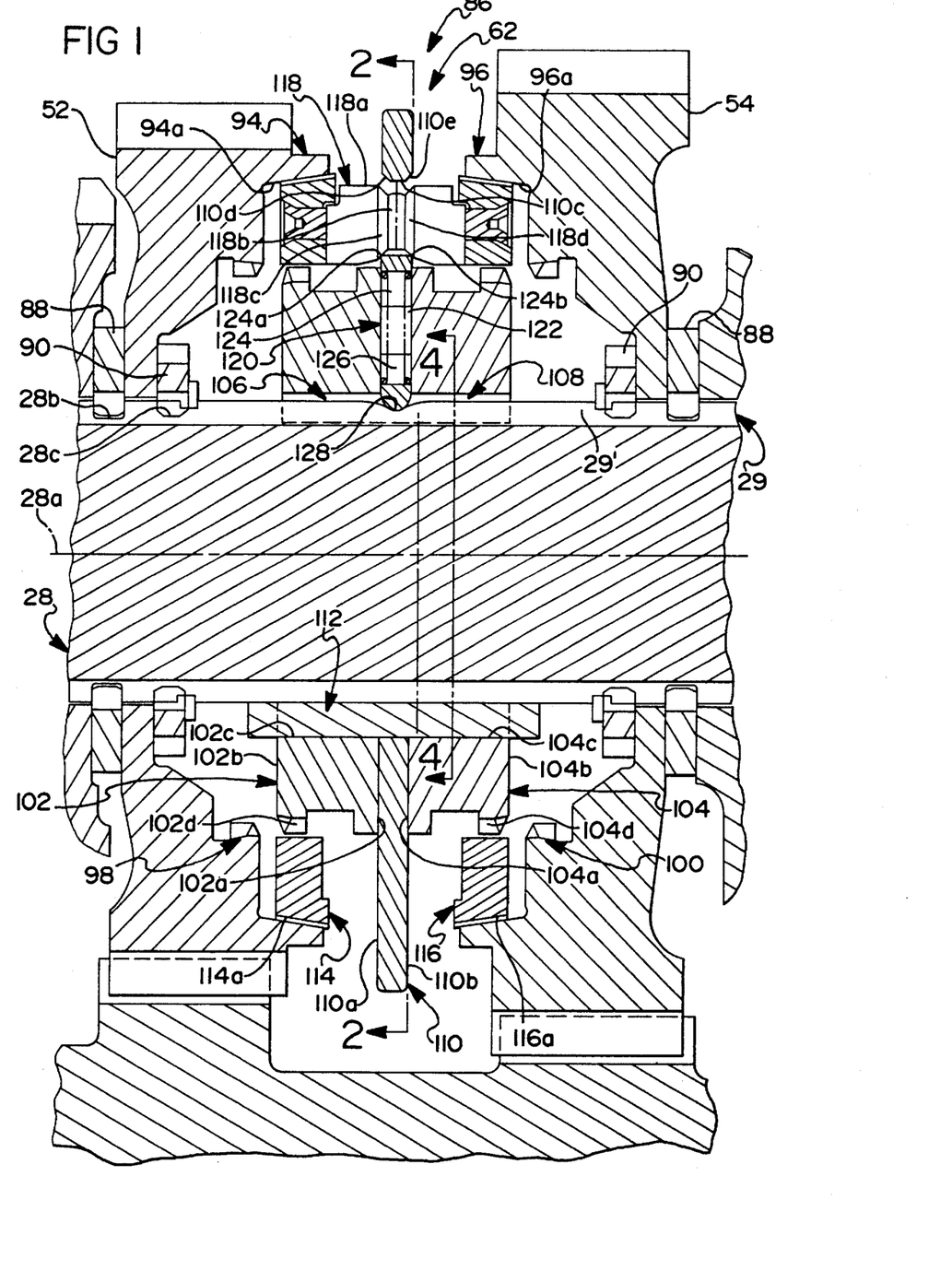
FIG. 1 is a sectional view of a double-acting synchronizer mechanism looking along line 1—1 of FIG. 2.
Figure 2:
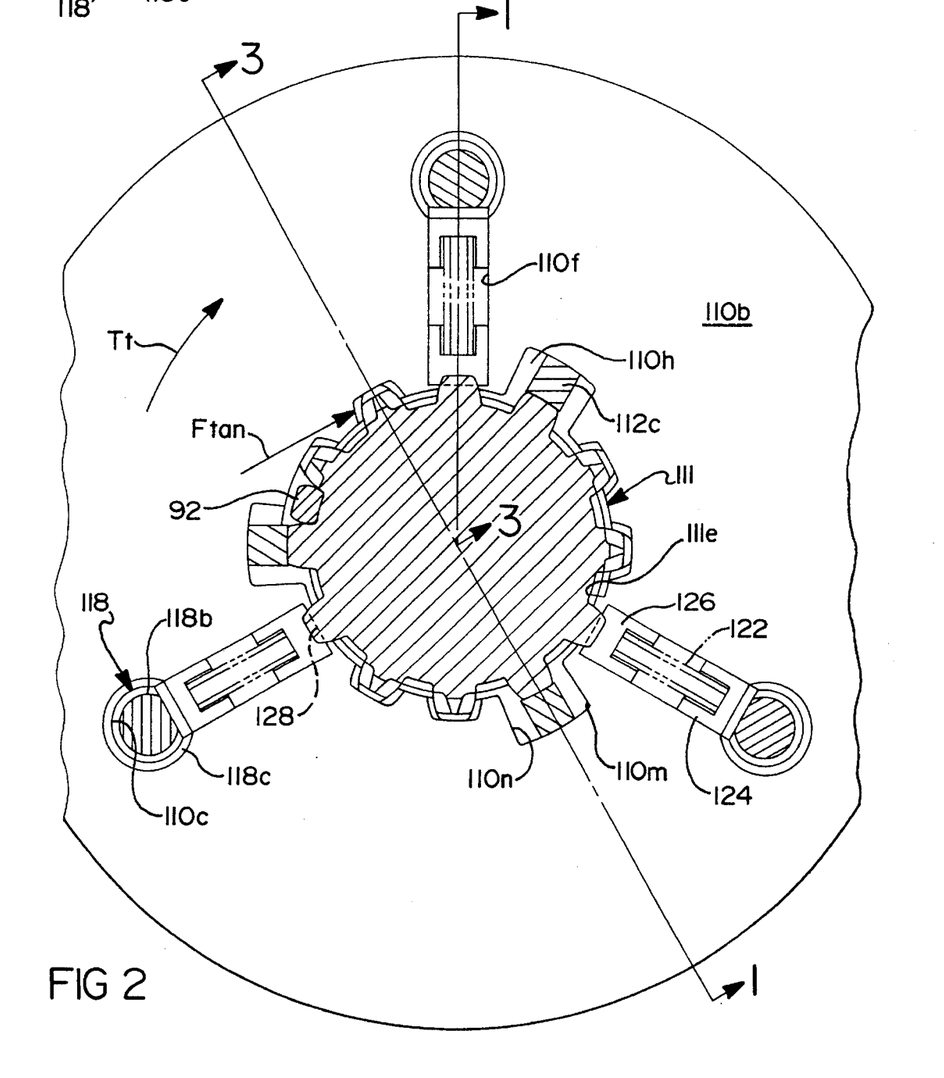
FIG. 2 is a partially sectioned view of the mechanism looking along line 2—2 of FIG. 1.
Figure 3:
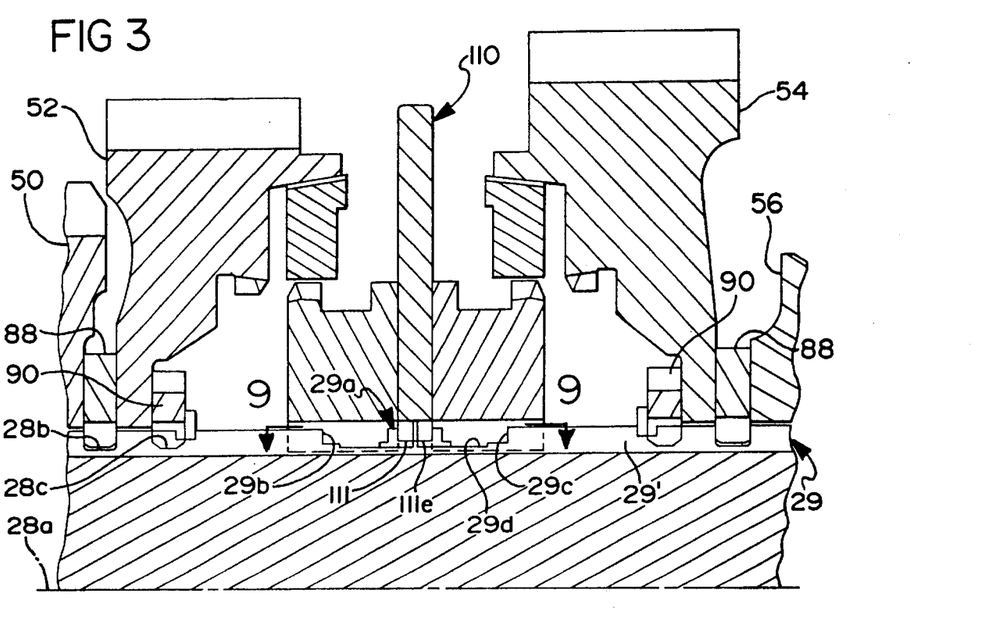
FIG. 3 is a partial view of the mechanism in FIG. 1 looking along line 3—3 of FIG. 2.

Looking now mainly at FIGS. 1–3, therein is shown in detail a gear and synchronizer assembly 86 including a shaft 28 mounted for rotation about a central axis 28a, axially spaced apart gears 52,54 rotatably supported on the shaft and secured against axial movement relative to the shaft by annular thrust members 88,90 and a double-acting synchronizer clutch mechanism 62. Thrust members 88,90 are axially retained in annular grooves 28b,28c in spline teeth 29 of the shaft and are affixed against rotation relative to the shaft by a retainer pin 92 (FIG. 2) disposed in a space between two of the teeth 29.

Figures 4, 5:
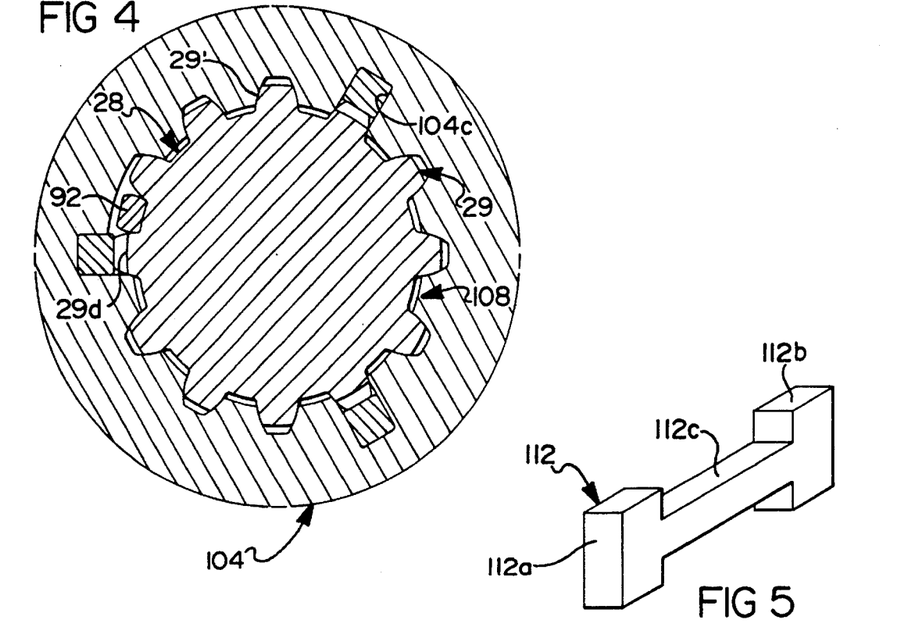
FIG. 4 is a sectional view of a portion of the mechanism looking along line 4—4 of FIG. 1.
FIG. 5 is a perspective view of a component in FIGS. 1 and 2.

The synchronizer mechanism 62 includes annular gear friction member portions 94,96 and gear jaw clutch member portions 98,100 integrally formed with gears 52,54, jaw clutch members 102,104 each including a central opening having internal spline teeth 106,108 slidably mating with the external spline teeth 29 integrally formed with shaft 28 or otherwise affixed thereto, a radially extending shift flange 110 having axially oppositely facing sides 110a, 110b sandwiched between axially facing surfaces 102a, 104a of the jaw members 102,104 and a central opening 111e slidably received by shaft 28, three H-shaped retainer members 112 (one of which is shown in perspective in FIG. 5) for securing the flange and jaw members against relative axial movement, annular friction members or rings 114,116 rigidly secured together by three circumferentially spaced apart pins 118 extending axially from each of the friction members and through openings 110c in the flange, and three pre-energizer and neutral centering assemblies 120 each including a spring 122 interposed between a pre-energizer plunger 124 and a neutral position plunger 126 which, respectively, react between surfaces defined by pin 118 and a detent recess 128 formed in an outer surface of shaft 28. The number of retainers 112, pins 118, and assemblies 120 may be more or less than disclosed herein. Further, the pre-energizer plungers and the neutral position plungers may be disposed in separate slots in flange 110 or in recesses in one or both of jaw members 102,104.

As is readily seen, friction members 94, 114 and 96, 116 pair up to define friction clutches for synchronizing the gears to the shaft prior to engagement of the jaw clutches. Cone clutches are preferred; however, other types of friction clutches may be used. Friction members 94,96 may be affixed to the associated gears in any of several known ways. Friction members 94,96 have internal cone friction surfaces 94a,96a which respectively mate with external cone friction surfaces 114a,116a. Members 94,96 and 114,116 also are respectively referred to as synchronizer cups and rings.

A wide range of cone angles may be used; cone angles of seven and one-half degrees are employed herein. The friction surfaces 114a, 116a and/or 94a,96a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Figure 6:
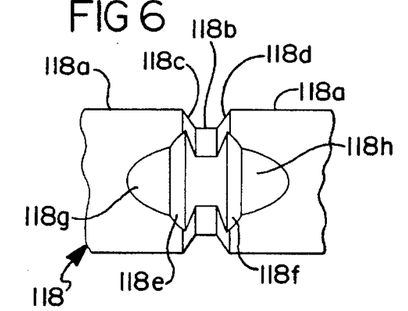
FIG. 6 is a detailed view of a pin component in FIGS. 1 and 2.

Pins 118 are shown in greater detail in FIG. 6. Each pin includes major diameter portions 118a having diameters slightly less than the diameter of flange openings 110c, a reduced diameter or groove portion 118b spaced between friction rings 114,116 (herein midway), conical blocker shoulders or surfaces 118c, 118d extending radially outward from the pin axis and axially away from each other at angles herein of about forty degrees relative to a line normal to the pin axis, and preferably, but not necessarily, independent pre-energizer surfaces 118e,118f and extended secondary centering surfaces 118g, 118h. The grooved portions, when disposed within their respective flange openings, allow limited rotation of the rigid friction ring and pin assembly relative to the flange to effect engagement of the pin blocker shoulders with chamfered blocker shoulders 110d,110e defined about the flange openings. The pre-energizer surfaces 118e, 118f chordally intersect or remove a portion of conical blocker shoulders 118c, 118d, are preferably (but not necessarily) flat planar surfaces and form angles relative to the pin axis which are somewhat less than the angles of the blocker surfaces. Centering surfaces 118g, 118h are also flat planar surfaces and, as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Alternatively, surfaces 118e–118h may be dispensed with, pre-energizer plungers 124 then react against blocker surfaces 118c, 118d.

The helical compression springs 122 disposed in slots 110f of the flange bias plungers 124 radially outward toward the pin pre-energizer surfaces and bias plungers 126 radially inward toward the neutral position detents 128. The major extent of the slots preferably extends radially relative to the shaft axis. The slots also extend axially through the flange sides 110a, 110b, into flange openings 110c, and into the central opening 111e or inside diameter of flange 110. Plungers 124,126 may be formed of a sheet metal material but are preferably formed of a cast or compacted material such as steel to provide structural rigidly and surface hardness. Each plunger 124,126 has a somewhat U-shaped cross-section with a closed end defining a head portion having rounded or flat angled surfaces for cooperating with the detent recesses or the flat pre-energizer surfaces. The sidewalls of each plunger have surfaces for slidably cooperating with the radially extending sidewall surfaces of the slot 110f to retain the plungers in the circumferential direction. The plunger sidewalls also have surfaces for slidably cooperating with the axially facing, radially extending end surfaces 102a, 104a of jaw members 102,104 to retain the plungers in the axial direction.

As previously mentioned, jaw members 102, 104 include internal spline teeth 106, 108 slidably mating with external spline teeth 29 affixed to the shaft. The external splines have involute flank surfaces 29' extending parallel to the shaft axis, and the mating thereof with flank surfaces of the jaw member splines prevents relative rotation therebetween. H-shaped members 112 each include end portions 112a, 112b, which react against jaw member surfaces 102b, 104b, and a center portion 112c which interconnects the end portions. The center portion extends snugly through axially extending slots 102c, 104c in the jaw members and freely through openings 110h having radially extending stop surfaces 110n, 110m which cooperate with center portion 112c to limit rotational movement of the flange relative to the jaw members and shaft for reasons explained hereinafter.

Figure 7:
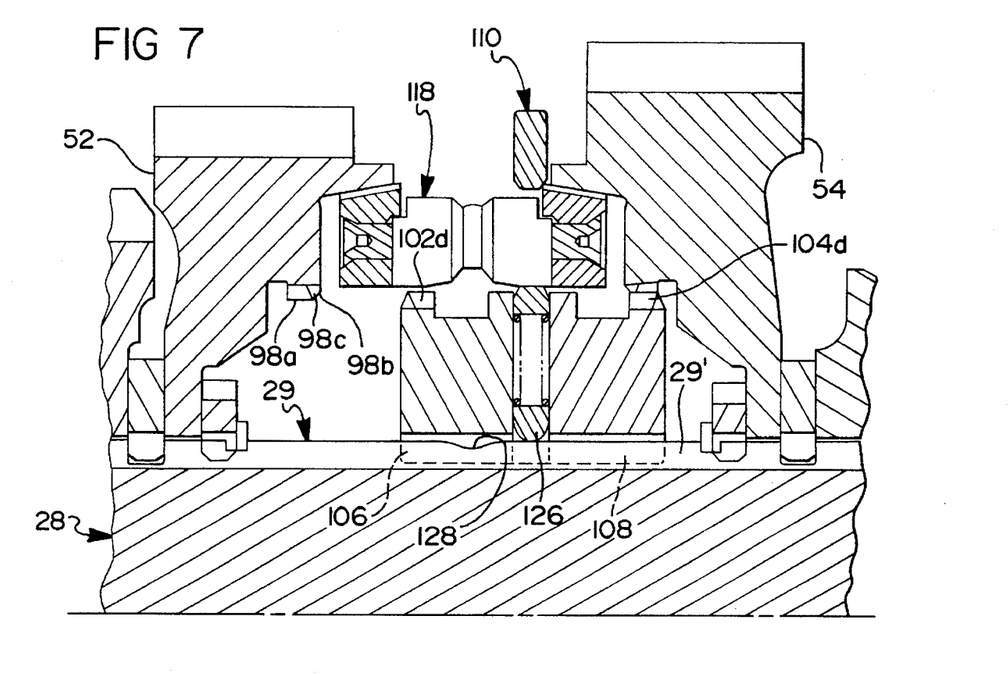
FIGS. 7 and 8 are partial views of the mechanism in FIGS. 1 and 3 with a jaw clutch thereof in an engaged position.
Figure 8:
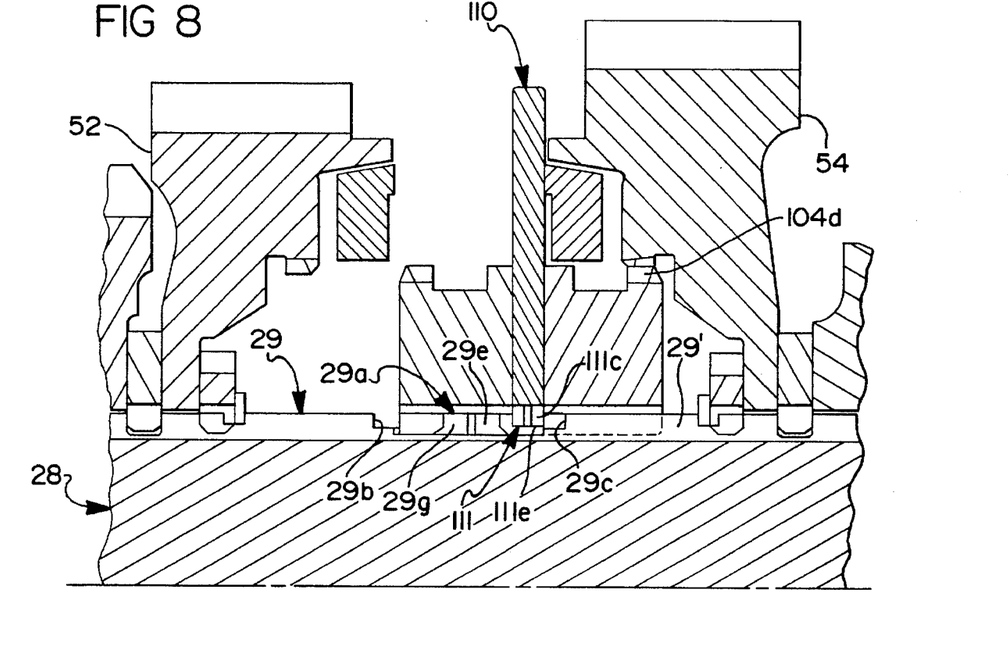

As best seen in FIGS. 1–3 and 7–10, portions of some of the external teeth 29 of the shaft in both axial directions from the FIGS. 3 and 8 neutral position of flange 110 are-modified to provide one or more ramp surfaces which cooperate with a like number of ramp surfaces defined by reaction means or internal teeth 111 extending radially inward from flange 110 and into the axially extending spaces between shaft splines 29. The ramp surfaces allow limited rotation of the flange relative to jaw members 102,104 and shaft 28, and react synchronizing torque between the cone clutches and shaft to provide an additive axial self-energizing force for increasing the engaging force of the cone clutch initially engaged by a shift force applied to flange 110, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, each tooth 29, circumferentially between each H-shaped retainer center portion 112c, has first and second axially spaced apart recesses defining annular grooves having first ends defined by a post-like portion 29a, axially opposite ends 29b,29c, and minimum outside diameters 29d. The minimum outside diameters 29d are greater than the root diameter of splines 29 and greater than the inside diameters 106a, 108a of the jaw clutch splines 106, 108. Also, the minimum outside diameters 29d are less than the inside diameter of flange 110, i.e., inside diameters 111e of internal teeth 111. The post-like portion 29a has a diamond-shape, formed by removing portions of each tooth in both axial directions therefrom. The axial and radial extent of the removed portions are selected to facilitate ease of machining boost ramp surfaces 29e,29f, 29g,29h on post portion 29a and to minimize the effects such removal has relative to the strength of the teeth. Further, spline teeth 29 are provided with sufficient radial depth to ensure that the ramp surfaces have enough surface area to minimize wear due to forces acting thereon. The axial extent of the removed portions or recesses between axial ends 29m,29n of post portion 29a and axial ends 29b,29c of teeth 29 are formed by simply machining annular grooves in the teeth. The axial length of removed portions is sufficient to facilitate insertion of a machining tool to form the ramp surfaces. Ramp surfaces 29e,29f respectively react against ramp surfaces 111a, 111b on flange teeth 111 to provide the additive axial forces to increase or assist the synchronization rate of gear 54 in response to torque in either direction. Ramp surfaces 29g,29h respectively react against ramp surfaces 111c, 111d to provide the additive axial forces for gear 52 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 110 by a shift fork may be varied by varying the ramp angles and/or the mean radii ratio.

Figure 11:
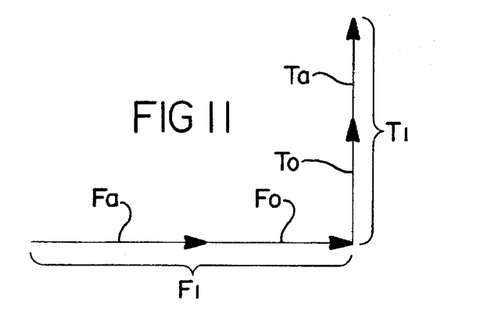
FIG. 11 is a graphical representation of axial forces and torques acting on a shift flange of the synchronizer.

With reference to FIGS. 1 and 8, when the flange 110 is in the neutral position, reduced diameter portions 118b of pins 118 are radially aligned with their associated flange openings 110c, friction surfaces of the cone clutches are slightly spaced apart and are maintained in this spaced relation by angled pre-energizer surfaces 124a,124b of the plungers 124 acting on pre-energizer surfaces 118e, 118f of pins 118 by the force of springs 122 and by springs 122 biasing neutral position plungers 126 into recesses 128. When it is desired to couple either gear to the shaft, an appropriate and unshown shift mechanism, such as disclosed in U.S. Pat. No. 4,920,815 and incorporated herein by reference, is connected to the outer periphery of flange 110 in known manner for moving the flange axially along the axis of shaft 28 either left to couple gear 52 or right to couple gear 54. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 110 in an axial direction and is represented by the length of arrow $F_o$ in FIG. 11.

Neutral position recesses are axially fixed relative to friction surfaces 94a,96a affixed to gears 52,54 and relative to the boost ramps on post-like portions 29a of shaft 28. Accordingly, neutral position spacing of surfaces 94a,98a relative to ring cone friction surfaces 114a, 116a is precisely controlled. Likewise, non-boost surfaces or flats 111f on circumferentially opposite sides of flange teeth 111 are precisely positioned relative to non-boost surfaces 29p on post-like portion 29a. Precise spacing of the friction surfaces reduces friction surface wear and parasitic heat generation between the surfaces due to surface contact and/or viscous shear of oil between the surfaces. Further, precise positioning of the non-boost surfaces prevents activation of the self-energizing ramps even if viscous shear of oil between the friction surfaces produces a torque that could otherwise activate the ramps. Still further, in the event non-boost surfaces are not used, the precise spacing of the friction surfaces should prevent viscous shear torque suffice to activate the ramps.

Initial rightward axial movement of flange 110 by the operator shift force $F_o$ is transmitted by pre-energizer plungers 124 to the pins by pre-energizer surfaces 118f to effect initial frictional engagement of cone surface 116a with cone surface 96a. The initial engagement force of the cone surface is, of course, a function of the force of springs 122 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 110 and the engaged friction ring, and hence, movement of the reduced diameter pin portions 118b to the appropriate sides of the flange openings 110c to provide engagement of pin blocker shoulders 118c with flange blocker shoulders 110d. When the blocker shoulders are engaged, the full operator shift force $F_o$ on flange 110 is transmitted to friction ring 116 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 11. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 110c to allow continued axial movement of the flange and engagement of the external jaw teeth 104d of jaw member 104 with internal jaw teeth 100a of jaw member 100, as shown in FIGS. 7 and 8. As is known in the prior art and as is specified by reference numbers only for jaw teeth 98a of jaw member 98 in FIG. 7, the lead portions of the jaw teeth have rake leading edges 98b to reduce tooth damage during initial contact, and have chamfer or wedge faces 98c to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. Also, the jaw teeth are preferably disposed about as large a diameter as is practicable.

Still ignoring the effects of the self-energizing ramps, cone clutch torque provided by the force $F_o$ is expressed by the following equation:

$$T_o = F_o R_c \mu_c / \sin\alpha$$

where:

$R_c$=the mean radius of the cone friction surface, $\mu_c$=the coefficient of friction of the cone friction surface, and $\alpha$=the angle of the cone friction surfaces.

Figure 9:
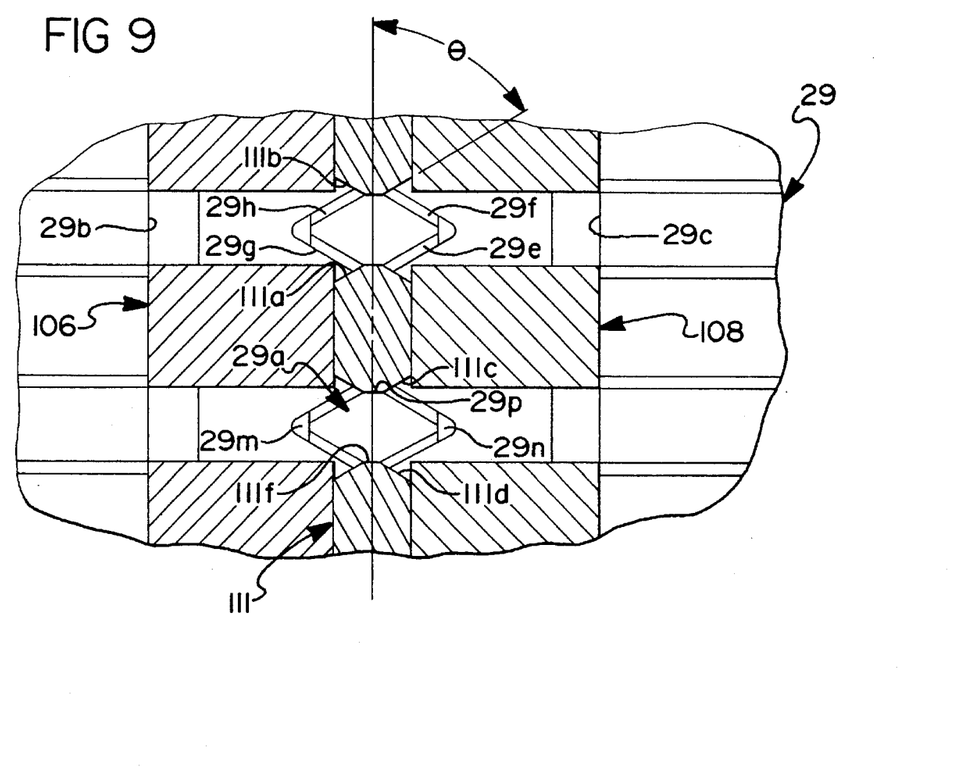
FIGS. 9 and 10 are sectional views of toothed portions of the mechanism looking along line 9—9 of FIG. 3.
Figure 10:
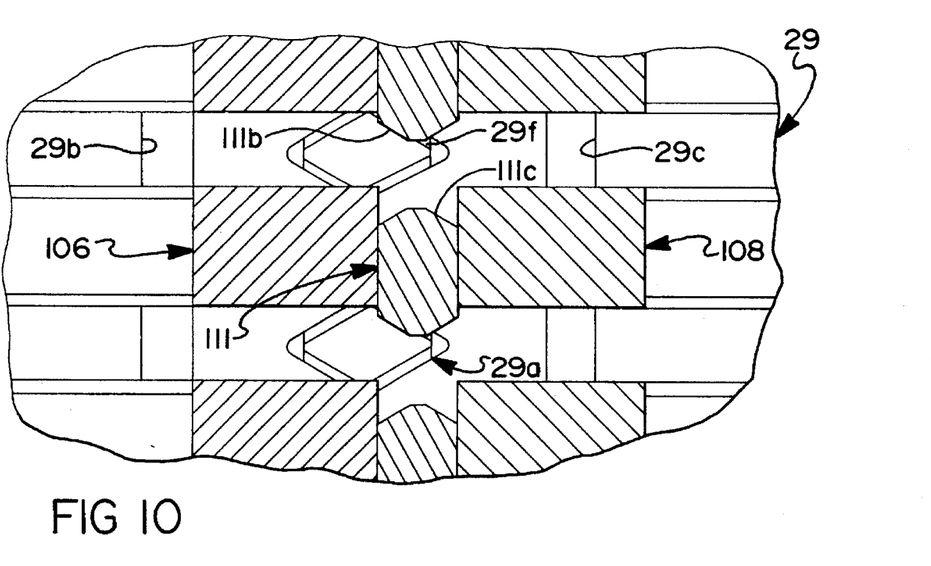

Looking now at the affects of the self-energizing ramps and referring particularly to FIGS. 9 and 10, the synchronizing torque $T_o$, due to the operator applied axial shift force $F_o$, is of course transmitted to flange 110 by pins 118 and is reacted to shaft 28 across the self-energizing ramp surfaces. The self-energizing ramp surfaces, when engaged, limit rotation of the flange relative to shaft 28 and jaw members 102,104, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 9 illustrates the position of the self-energizing ramp surfaces and the position of the jaw member splines 106, 108 to the shaft splines 29 while shift flange 110 is in the neutral position corresponding to the position of FIG. 3. FIG. 10 illustrates a position of the ramps and splines while gear 54 is being synchronized by engaged cone surfaces 96a,116a. The engaged cone surfaces are producing a synchronizing torque in a direction which has effected engagement of flange member ramp surfaces 111d with shaft ramp surfaces 29f. Hence, the sum of the axial forces for engaging the cone clutch are $F_o$ plus $F_a$ and the sum of the synchronizing torques being produced by the cone clutch are $T_o$ plus $T_a$, as graphically shown in FIG. 11. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected, the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase or decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. The pressure angle $\phi$ may be zero. Herein, the ramps have a pressure angle of 20 degrees. Further details for calculating and controlling self-energizing or boost forces may be obtained by reference to U.S. Pat. No. 5,092,439 which is incorporated herein by reference.

A preferred embodiment of a synchronizer mechanism with self-energizing and with improved neutral positioning has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizer mechanism for first and second axially spaced apart gears mounted for rotation and secured against axial movement on shaft means having an axis about which the gears and the shaft means rotate, the mechanism comprising:

gear friction and gear jaw means affixed to each gear, the gear friction means engagable with first and second axially spaced apart and axially movable friction means for respectively synchronizing the first and second gears with the shaft means, the gear jaw means engagable with axially movable jaw means of an assembly including a flange extending radially between the first and second friction means and means axially connecting the flange to the axially movable jaw means, the flange for axially moving the axially movable friction and jaw means from disengaged positions there of into said engagement in response to an axially bi-directional shift force ($F_o$) moving the flange from a neutral position thereof, toward one of said gears; the axially movable jaw means including axially extending internal spline teeth having flank surfaces disposed continuously in spaces between pairs of commonly facing axially extending flank surfaces of external spline teeth affixed to the shaft means blocker means operative when engaged for preventing engagement of the jaw means prior to the synchronizing, the blocker means including a plurality of circumferentially spaced pins rigidly extending axially from the first and second friction means and into pin openings of the flange, each of the pins having axially spaced apart blocker shoulders engagable with blocker shoulders defined on opposite sides of the flange and about the associated opening;

pre-energizer means for engaging either one of the first and second friction means in response to initial axial movement of the flange by the shift force ($F_o$) from the neutral position toward one of the gears for engaging the blocker means in response to engagement of the friction means producing a synchronizing torque ($T_o$) transmitted to the flange via the pins and for transmitting the shift force ($F_o$) to the engaged friction means via the engaged blocker means to increase the engaging force of the engaged friction means, the pre-energizer means including resilient means for positioning the friction means in the disengaged position thereof when the flange is in the neutral position thereof; characterized by:

detent means resiliently reacting between the assembly and the shaft means for positioning the assembly in the neutral position relative to the shaft means the detent means including a recess defining the neutral position and formed in an outer circumferential surface of the shaft means for receiving a radially movable neutral position plunger disposed in an elongated slot extending radially outward from a central opening in the flange and biased radially inward by a spring disposed in the slot.

2. The synchronizer mechanism of claim 1, including:

first self-energizing means including first and second ramp means engagable in response to synchronizing torque ($T_o$) in one direction for reacting the synchronizing torque between the friction means and the shaft means and for producing an axial additive force ($F_a$) for further increasing the force engaging the first friction means.

3. The synchronizer mechanism of claim 1, wherein:

the axially movable jaw means is defined by first and second jaw members having axially facing radially extending end surfaces sandwiching a portion of the radially extending flange therebetween;

the means connecting the flange allowing circumferential movement of the flange relative to the first and second jaw means and the shaft means;

at least one of the spaces between the external spline teeth having a first ramp surface formed in at least one of the pair of flank surfaces thereof, the first ramp surface forming an angle less than ninety degrees relative to a plane normal to the shaft axis and the flank surfaces; and reaction means extending radially inward from the flange and into the one space, the reaction means including a second ramp surface substantially parallel to the first ramp surface and engagable therewith in response to synchronizing torque in one direction for producing an axial additive force ($F_a$) on the flange in a direction of the shift force ($F_o$) for increasing the engaging force of the friction means.

4. The synchronizer mechanism of claim 1, wherein:

the axially movable jaw means is defined by first and second jaw members having axially facing radially extending end surfaces sandwiching portions of axially oppositely facing surfaces of the radially extending flange therebetween;

the flange radially extending slots equal in number to the flange openings, each slot having disposed therein one of the neutral position plungers and a pre-energizer plunger respectively adjacent the central and the pin openings, and each slot having one of the springs disposed therein and biasing the plungers in opposite radial directions; and each pre-energizer plunger having a head portion received by the reduced diameter portion of the pin disposed in the associated opening with the flange in the neutral position.

5. The synchronizer mechanism of claim 4, wherein:

the means connecting the flange allowing circumferential movement of the flange relative to the first and second jaw means and the shaft;

at least one of the spaces between the external spline teeth having a first ramp surface formed in at least one of the pair of flank surfaces thereof, the first ramp surface forming an angle less than ninety degrees relative to a plane normal to the shaft axis and the flank surfaces; and reaction means extending radially inward from the flange and into the one space, the reaction means including a second ramp surface substantially parallel to the first ramp surface and engagable therewith in response to synchronizing torque in one direction for producing an axial additive force ($F_a$) on the flange in a direction of the shift force ($F_o$) for increasing the engaging force of the friction means.

\* \* \* \* \*